Feb. 19, 1952     J. W. BOERGER     2,586,415
CLIPPER AND ELECTRIC MOTOR THEREFOR
Filed July 29, 1949     3 Sheets-Sheet 1

INVENTOR
JULIUS W. BOERGER
BY
ATTORNEYS

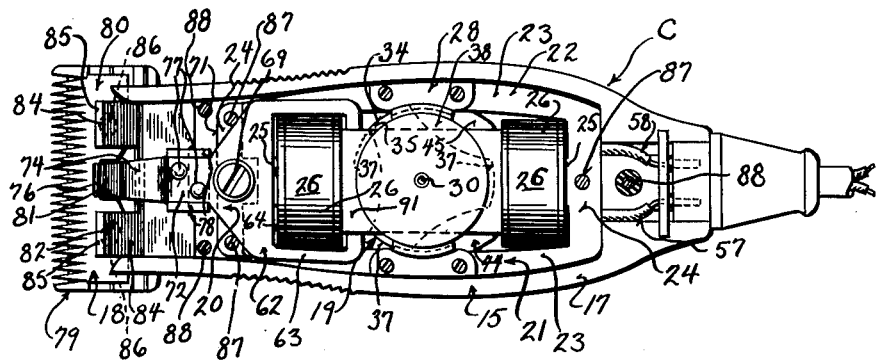
Fig. 4.
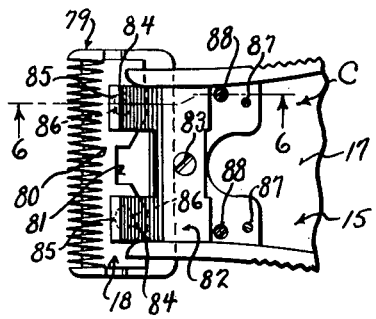
Fig. 5.
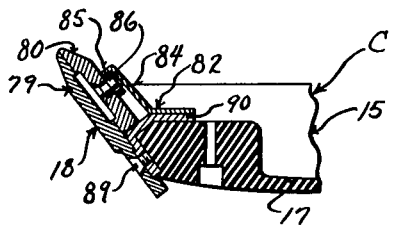
Fig. 6.
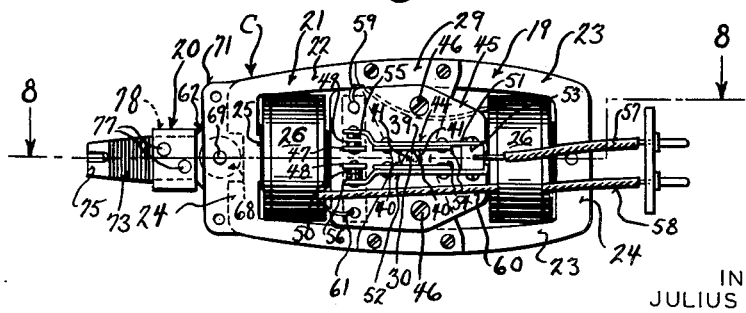
Fig. 7.
INVENTOR
JULIUS W. BOERGER
ATTORNEYS Feb. 19, 1952 J. W. BOERGER 2,586,415
CLIPPER AND ELECTRIC MOTOR THEREFOR
Filed July 29, 1949 3 Sheets-Sheet 3
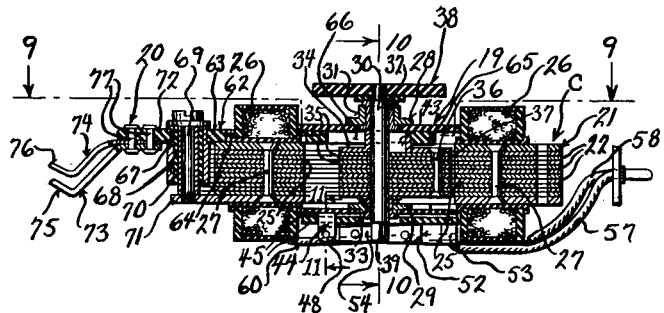
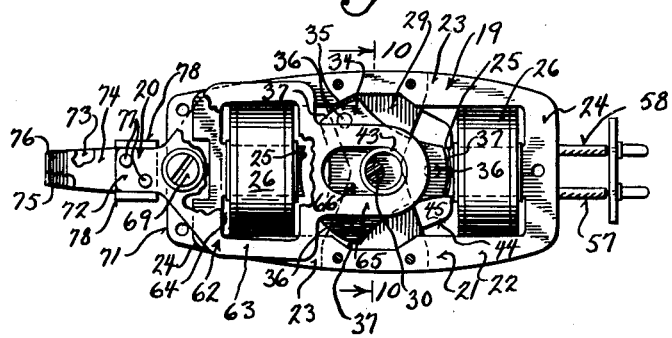
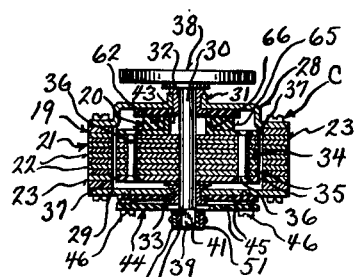
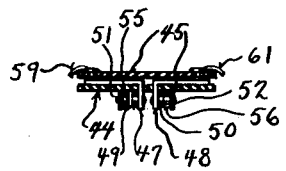
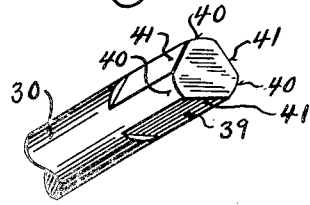
INVENTOR
JULIUS W. BOERGER
BY
ATTORNEYS Patented Feb. 19, 1952

2,586,415

UNITED STATES PATENT OFFICE 2,586,415

CLIPPER AND ELECTRIC MOTOR THEREFOR

Julius W. Boerger, Racine, Wis., assignor to All-over Manufacturing Company, Racine, Wis.

Application July 29, 1949, Serial No. 107,403

4 Claims. (Cl. 172—36)

This invention appertains to hair clippers, dry shavers, and the like, and more particularly to an electric motor for rapidly operating a desired blade or tool.

One of the primary objects of my invention is to provide a small, compact A. C. and D. C. electric motor which is so constructed as to deliver a maximum amount of power with a minimum amount of heat generation.

Another salient object of my invention is the provision of an electric motor for small portable appliances having diametrically opposed field poles, an armature provided with three poles and a circuit maker and breaker, operated by the rotation of the armature, alternately opened and closed as each of the three poles of the armature pass one of the opposing field poles so as to give six current impulses alternately through the field poles during each revolution of the armature and thus greatly increase the power of the motor relative to its size.

A further object of this invention is the provision of a novel construction of circuit maker and breaker and timing mechanism therefor, so that the circuit will be only open approximately 4° between each current impulse, and thus make a total of 24° open and 336° closed, during each revolution of the armature, whereby a substantially constant power will be delivered with a minimum amount of heat generation.

A further important object of the invention, is to provide a motor and a driving mechanism that can be assembled as a complete unit entirely independent of the housing, whereby the motor and driving mechanism can be economically made and fitted in a desired form of housing, for operating a selected device, such as a clipper or shaving head.

A further salient object of this invention is the novel construction of the armature so that the cam or eccentric for the driving mechanism can be formed from the top lamination of the armature and thereby give a durable, efficient and inexpensive structure.

A still further important object of the invention is the provision of a novel cutting mechanism which is simple and inexpensive to manufacture and one which can be quickly and easily attached to or detached from the housing and one in which the operating mechanism carried by the motor can be conveniently connected thereto.

A still further important object of the invention is to provide a novel arm forming a part of the driving mechanism for engaging the movable blade of the cutting assembly, so as to insure the proper operation of the movable blade with a minimum amount of vibration, and whereby the cutting mechanism will be positively insulated from the motor.

With these and other objects in view, the invention consists in the novel construction, arrangement and formation of parts, as will be hereinafter more specifically described and claimed and illustrated in the accompanying drawings, in which drawings:

Figure 4 is a longitudinal, sectional view through the clipper taken on the line 4—4 of Figure 2, looking in the direction of the arrows.

Figure 5 is a fragmentary top plan view of the lower half of the clipper casing, the motor and the driving mechanism being shown removed therefrom.

Figure 6 is a fragmentary longitudinal sectional view taken on the line 6—6 of Figure 5, looking in the direction of the arrows, illustrating the cutting mechanism of the assembly and the means for attaching the same to the housing.

Figure 7 is a bottom plan view of the motor and the drive mechanism removed from the housing.

Figure 8 is a longitudinal sectional view through the motor and driving mechanism taken on the line 8—8 of Figure 7, looking in the direction of the arrows.

Figure 9 is a top plan view of the electric motor and driving mechanism, parts of the view being in section and the parts in section being taken on the line 9—9 of Figure 8, looking in the direction of the arrows.

Figure 10 is a transverse sectional view through the motor, taken on the line 10—10 of Figure 9, looking in the direction of the arrows.

Figure 11 is a detail, transverse sectional view illustrating the contact arms and points for the circuit maker and breaker, the section being taken on the line 11—11 of Figure 8, looking in the direction of the arrows.

Figure 12 is an enlarged fragmentary detail perspective view of the armature shaft, showing the end thereof utilized for actuating the circuit maker and breaker.

Referring to the drawings in detail, wherein similar reference characters designate corresponding parts throughout the several views, the letter C generally indicates an electric hair clipper or dry shaver, constructed in accordance with the present invention.

Figure 1:
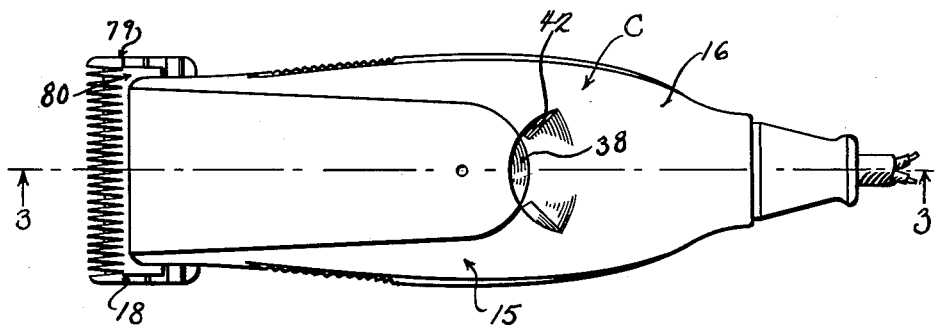
Figure 1 is a top plan view showing a complete clipper or dry shaver constructed in accordance with this invention.
Figure 2:
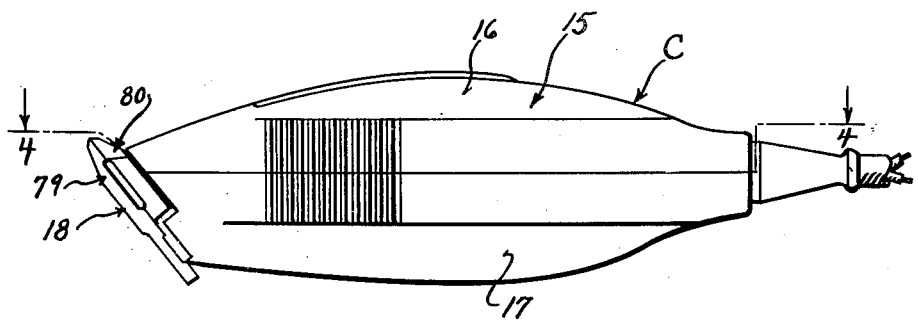
Figure 2 is a side elevational view of the same.

As illustrated, the clipper includes a housing 15, preferably formed from two longitudinal half-sections 16 and 17. The front part of the housing or casing terminates at an angle to the longitudinal axis of the housing so that the cutting mechanism or assembly 18 can be disposed at a desired cutting angle.

The housing 15 detachably receives the novel electric motor 19 and the operating mechanism 20 for the cutting assembly 18. As can be clearly seen in Figures 7 to 9, inclusive, the motor 19, and the operating mechanism 20 are mounted together as a single unit and this forms one of the features of this invention.

The motor 19 includes a frame or field core 21 including a plurality of laminations 22. This frame or field consists of bowed, longitudinally extending side pieces 23, and integral end pieces 24. The end pieces 24 carry the inwardly extending, diametrically opposed field poles 25. The field poles 25 receive the usual field windings 26. As is clearly shown in Figure 8, the various laminations 22 of the field or frame can be united together by rivets 27. The frame or field at other desired points is provided with suitable openings for permitting the connection of certain bridge plates, the drive mechanism and the cutting assembly, as will be later more fully pointed out.

Securely fastened to the frame or field between the field poles formed by the field laminations and the windings, are top and bottom bridge frame plates 28 and 29. The bridge plate 28 is bowed intermediate its ends and the bridge plates 28 and 29 support and carry, in a novel way, the armature shaft 30. The bridge plate 28 is provided with a struck out substantially cylindrical bearing boss 31, for receiving a suitable bearing sleeve 32, for the armature shaft 30. The lower bridge plate 29, has formed therein an opening for receiving a similar bearing sleeve 33 for the armature shaft. The ends of the bearing sleeves can be flanged so as to prevent longitudinal shifting thereof in the bridge plates.

The armature shaft 30 carries the armature 34. This armature also consists of a series of laminations 35 riveted together as at 36. The armature consists of three radially extending poles 37 located at 120° relative to one another around the armature shaft. Any desired means can be utilized for firmly uniting the armature 34 to the armature shaft 30. At this time, it is to be noted that the upper end of the armature shaft 30, has rigidly secured thereto a finger knob or wheel 38, for starting purposes and the lower end of the armature shaft is provided with a triangularly shaped timing head 39. This triangular shaped timing head 39, defines radially extending cam points 40 and flat sides 41.

Figure 3:
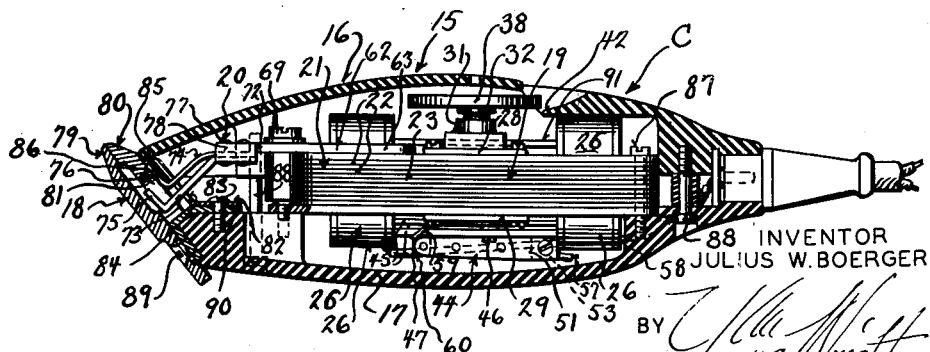
Figure 3 is a central longitudinal sectional view through the clipper taken on the line 3—3 of Figure 1, looking in the direction of the arrows, the motor being shown in side elevation.

The casing or housing 15 has its upper half 16 provided with a slot 42, through which, partially protrudes the starter finger knob or wheel 38, as is best shown in Figures 1 and 3.

The uppermost lamina 36 of the armature 34 at the central portion thereof is struck up around the armature shaft 30 to form an eccentric or cam 43, which forms a part of the driving mechanism 20, for the cutting assembly 18.

The bottom bridge plate 29, carries the circuit maker and breaker 44. The circuit maker and breaker includes a pair of superimposed supporting plates 45 of insulation, which are secured to the bridge plate 29, in any desired way, such as by fastening screws 46. Securely fastened between the plates 45 adjacent to their forward ends are spaced contact plates 47 and 48. The inner ends of these plates 47 and 48 carry right angularly extending legs which protrude through the outermost plate of insulation 45. The outer faces of the legs are provided with contact points 49 and 50. Cooperating with the contact points 49 and 50, are resilient contact arms 51 and 52. The rear ends of the resilient contact arms 51 and 52 are secured to a conductor block 53 and this conductor block is in turn rigidly fastened to the plates of insulation 45. The inner faces of the resilient arms carry wear strips 54, preferably formed from insulating material and the arms are normally urged inwardly toward one another by their inherent resiliency so that contact points 55 and 56 carried by the outer ends thereof normally engage the contact points 49 and 59 of the contact plates 47 and 48. When the cam points 40 of the timing head 39 engage a wear strip 54, its contact arm will be moved outwardly to space the contact point carried thereby from the contact point of a contact plate. When a strip engages a flat side 41 of the timing head 39, the resilient arm carrying the same can move inwardly so that the contact point thereon will electrically engage a contact point of one of the contact plates.

Attention is now directed to the wiring for the motor and it is to be noted that a lead wire 57 is electrically connected to the conductor block 53, so that current can flow through this block and through the resilient contact arms 51 and 52. A return wire 58 is electrically connected with one terminal of the winding 26 for a field pole at one end of the motor and the opposite terminal of this winding is connected by a wire 59 to the conductor plate 47. A branch wire 60 leads off of the wire 58 and is electrically connected to one terminal of the winding 26 of the other field pole and the other terminal of this winding has connected thereto a wire 61 which is electrically connected to the conductor plate 48.

It can be seen that current will flow through wire 57 (see Figure 7) to block 53, contact arm 52, contact points 56 and 50, plate 48, wire 61, through the front field coil, back to return wire 58 through branch wire 60. Upon a turn of 4° of the armature shaft, the arm 52 will be moved outwardly away from the contact point 50 by one of the cam points 40 of the timing head to a circuit breaking position, and the arm 51 will move inwardly under its inherent resiliency as one of the flat sides of the timing head rides toward the same and the contacts 55 and 49 will engage. The current flow will then be as follows: through wire 57, block 53, arm 51, plate 47, wire 59, winding 26 of the core or rear pole of the motor, to return wire 58. This action is continuous and it can be seen that the circuit will be open approximately only 4° between each current impulse, thus making a total of 24° open and 336° closed during each revolution of the armature. By referring to Figures 7 and 9, it can be seen that the flat sides of the timing head are between the poles of the armature but with the cam points of the timing head slightly off of the radial center of the armature poles, so that the circuit through a field coil will be momentarily open, as an armature pole leaves the magnetic field of a field coil. This gives a substantially constant power for bringing about the smooth operation of the actuating mechanism 20, which will now be described.

The actuating mechanism 20 includes an operating lever 62 preferably formed from a plate of fiber or similar insulating material and this lever includes a flat body portion 63, provided with a central cut out portion 64 for receiving the windings of the front field coil. Formed on this body 63, is a rearwardly extending arm 65 having an opening 66 for receiving the cam 43 formed from the uppermost lamination of the armature 36. The forward end of the body of the lever is provided with a bearing opening 67 for receiving a bearing sleeve 68. The bearing sleeve 68 is fitted around and is insulated from a supporting stud 69, by a sleeve of insulation 70. The stud 69 is removably carried by a projecting portion 71 of the lowermost lamination 22 of the frame or field 21 of the motor. From the construction so far, it can be seen that upon rotation of the armature that the lever 62 will be rapidly oscillated back and forth on the pivot stud 69. Formed on the body 63 of the lever at its axial longitudinal center and immediately forward of the stud 69, is a lever leg 72 which forms a support for a metal drive arm 73 and a resilient tension arm 74. The drive arm 73 includes the forwardly extending drive nose 75, which is preferably bifurcated, as shown in Figure 7. The tension arm 74 is also provided with the forwardly extending, outwardly angled tension foot 76 for a purpose, which will also more fully hereinafter appear. It is to be noted that the drive arm and tension arm 74 are arranged in superimposed relation and the rear ends thereof are rigidly secured to the lever extension 72 by rivets or the like 77. In order to gain rigidity, the sides of the drive arm 73, at its point of attachment to the lever extension 72, has formed thereon side flanges 78, which embrace the outer edges of said lever extension 72.

Now referring to the cutting assembly 18, the same includes a stationary cutter or comb plate 79 and a movable cutter blade 80. The rear edge of the movable blade 80 at its transverse center, is provided with a flared bearing notch 81 for receiving the bifurcated drive nose 75 of the arm 73. The tension arm 74 projects forwardly and downwardly toward the blade 80 and its foot 76 bears against the same, thereby creating continuous pressure thereon during the reciprocation thereof.

A guide is provided for the reciprocating cutter blade 80 and this guide includes an attaching plate 82 rigidly fastened as at 83 to the lower half 17 of the casing 15 at the extreme forward end thereof. Formed on the front edge of the supporting plate 82 are spaced guide legs 84 which lie on opposite sides of the bearing notch 81. These guide legs 84 include forwardly extending right angular flanges 85 which receive and guide bearing studs 86 rigidly carried by the movable cutter blade during the reciprocating thereof.

In the assembling of the device, the motor 19 is rigidly fastened to the lower half 17 of the casing through the medium of removable screws 87. After the plate 82 has been placed in position, the drive arm 73 and the tension arm 74 will lie between the two guide legs 84. The upper half of the casing 15 is now placed in position over the motor and is securely fastened to the lower half 17 by removable screws 88.

The device is now ready to receive the cutter assembly 18, and movable blade 80 is placed against the front of the casing with the flanged ends 85 of the legs 84 over the bearing studs 86. The driving arm 73 will be received in the drive notch 81 and the forward end of the tension foot will exert a continuous downward pressure on the cutting blade. The stationary comb blade 79 is secured to the front of the casing by means of removable fastening screws 89. The motor is now ready for use and upon the closing of the circuit through the motor by suitable switch (not shown) the device can be operated. If upon the closing of the switch, the motor does not instantly start, an initial rotary impulse can be given to the armature by the fingers through the medium of the hand wheel 38.

If desired, in order to reinforce the front of the casing 15, and to prevent breakage thereof, the front of the lower half 17 of the casing, can have secured thereto a guard bracket 90. This bracket 90 can be secured in place by the same screws 83, utilized for holding the guide plate 82 in position. The bracket 90 forms a desirable means for supporting the stationary blade 79 and the screws 89 for the stationary blade can be threaded into this bracket.

Due to the fact that the body portion of the operating lever 62 is formed from insulating material, all danger of the operator receiving an electric shock through the driving mechanism is eliminated and it is to be noted (see Figure 3), that the supporting bracket 90 and the guide plate 82 are well spaced forwardly from the motor.

A plate 91 of insulation can be placed under the top bridge plate 28 of the frame of the motor between the field coils 26, to hold the coils in their proper spaced relation.

Changes in details may be made without departing from the spirit or the scope of the invention, but what is claimed as new is:

1. In an electrically operated device, a casing, an electric motor in said casing including a field frame having diametrically opposed field poles, said frame including a plurality of laminations and defining side and end pieces, supporting bearing straps bridging said side pieces, an armature shaft rotatably mounted in said bridge pieces, an armature rigidly secured to the armature shaft including a plurality of laminations, the outermost lamination being provided with an integral cam surrounding the armature shaft, and an operating lever rockably carried by the frame of the motor having a bearing opening receiving the armature shaft and the cam.

2. In an electric motor to operate on A. C. or D. C. current, a field frame including longitudinal side pieces and connecting end pieces, field poles carried by the end pieces arranged diametrically opposite each other, an armature shaft mounted to rotate in said field frame, an armature mounted to said shaft having three poles, said armature shaft having a triangular shaped timing head at one end including flat sides and cam points, a circuit maker and breaker including a conductor block, contact arms electrically secured to said block, conductor plates insulatedly mounted on the bridge plates, said contact arms being urged by spring pressure into engagement with said conductor plates, said timing head being arranged between said contact arms to urge the arms away from the conductor plates upon engagement of the cam points therewith, said field poles being provided with field windings, feed and return wires, means electrically connecting the feed wire with the conductor block, means electrically connecting the return wire with one terminal of one field coil, means connecting the other terminal of the mentioned field coil to one conductor plate, means electrically connecting the return wire to one terminal of the other field winding and means connecting the other terminal of the last mentioned winding to the other conductor plate.

3. In an electric motor to operate on A. C. or D. C. current, a longitudinal field frame including field poles arranged diametrically opposite each other, said field poles being provided with field windings, an armature shaft rotatably carried by the frame, an armature having three field poles secured to the armature shaft to rotate with the armature shaft in said field frame between the field poles, said armature shaft having a triangular shaped timing head including flat sides and cam points, a circuit maker and breaker actuated by the timing head to alternately close the circuit to said field windings, thereby creating six current impulses made up of three pulses in each field pole for each revolution of the armature, said cam points being slightly off the radial center of each armature pole, and means electrically connecting a current source to the circuit maker and breaker and field coils.

4. In a drive motor for electric hand tools, a field frame including longitudinal side pieces and connecting end pieces, field poles carried by the end pieces and arranged diametrically opposite each other, bearing bridge plates carried by said side pieces, an armature shaft rotatably mounted in the bridge plates, an armature secured to said shaft including three poles, an operating lever rockably mounted in the frame, means operatively connecting the lever to the armature, said armature shaft having a triangular shaped timing head at one end including flat sides and cam points, a circuit maker and breaker including a conductor block, resilient contact arms electrically secured to the opposite sides of the block, conductor plates insulatedly mounted on the bridge plates, said contact arms being normally urged by their inherent resiliency into engagement with the conductor plates, said timing head being arranged between said resilient contact arms to urge the arms away from the conductor plates upon engagement of the cam points therewith, said field poles being provided with field windings, feed and return wires, means electrically connecting the feed wire with the conductor block, means electrically connecting the return wire with one terminal of one field coil, means connecting the other terminal of the mentioned field coil to one conductor plate, means electrically connecting the return wire to one terminal of the other field winding and means connecting the other terminal of the last mentioned field winding to the other conductor plate.

JULIUS W. BOERGER.

REFERENCES CITED

The following references are of record in the file of this patent:

UNITED STATES PATENTS

| Number | Name | Date |
|---|---|---|
| 934,462 | Prevost | Sept. 21, 1909 |
| 1,436,335 | Billings | Nov. 21, 1922 |
| 1,507,716 | Redman | Sept. 9, 1924 |
| 1,525,826 | Perlman | Feb. 10, 1925 |
| 1,839,924 | Lutes | Jan. 5, 1932 |
| 2,013,229 | Andis | Sept. 3, 1935 |
| 2,064,038 | Schick | Dec. 15, 1936 |
| 2,231,466 | Hanley | Feb. 11, 1941 |
| 2,286,629 | Kobler et al. | June 16, 1942 |
| 2,288,183 | Dalkowitz | June 30, 1942 |
| 2,347,870 | Amdur | May 2, 1944 |